US008814317B2

(12) United States Patent
Enomoto

(10) Patent No.: US 8,814,317 B2
(45) Date of Patent: Aug. 26, 2014

(54) LIQUID EJECTION HEAD AND METHOD OF MANUFACTURING THE SAME

(71) Applicant: Canon Kabushiki Kaisha, Tokyo (JP)

(72) Inventor: Takanori Enomoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/711,435

(22) Filed: Dec. 11, 2012

(65) Prior Publication Data

US 2013/0194342 A1 Aug. 1, 2013

(30) Foreign Application Priority Data

Dec. 13, 2011 (WO) .................. PCT/JP2011/078744

(51) Int. Cl.
*B41J 2/015* (2006.01)
*B23P 17/00* (2006.01)
*B41J 2/04* (2006.01)

(52) U.S. Cl.
USPC ............................... 347/20; 29/890.1; 347/54

(58) Field of Classification Search
USPC ......................... 347/20, 54; 438/21; 29/890.1
See application file for complete search history.

(56) References Cited

U.S. PATENT DOCUMENTS

2002/0075357 A1* 6/2002 Ohashi et al. .................. 347/56

FOREIGN PATENT DOCUMENTS

| | | | |
|---|---|---|---|
| JP | 8-39848 | A | 2/1996 |
| JP | 10-100416 | A | 4/1998 |
| JP | 10-100423 | A | 4/1998 |
| JP | 2004-195689 | A | 7/2004 |
| JP | 2009-255517 | A | 11/2009 |

* cited by examiner

*Primary Examiner* — Lisa M Solomon
(74) *Attorney, Agent, or Firm* — Canon USA Inc IP Division

(57) ABSTRACT

Provided is a liquid ejection head formed by performing bonding and fixing operations speedily and highly accurately when a recording element board is bonded to a supporting member, the liquid ejection head having a high liquid-landing accuracy and achieving a high printing quality. A method of manufacturing the liquid ejection head is also provided.

Heat is conducted from a holding member, which supports the recording element board, to a thermosetting adhesive via the supporting member, which supports the recording element board, in order to accelerate the curing of the adhesive.

14 Claims, 7 Drawing Sheets

LIQUID EJECTION HEAD AND METHOD OF MANUFACTURING THE SAME

TECHNICAL FIELD

The present disclosure relates to a liquid ejection head for performing recording on a recording medium by ejecting a liquid such as ink through an orifice, and also relates to a method of manufacturing the liquid ejection head.

BACKGROUND ART

An existing liquid ejection head is constituted by components including a recording element board, through which a recording liquid is ejected, a supporting member, which supports and secures the recording element board, and an electric wiring tape, which transmits an ejection signal to the recording element board.

Generally, the recording element board is bonded and fixed to the supporting member with an adhesive. The supporting member includes a contact reference surface used to position the liquid ejection head when the liquid ejection head is mounted on an inkjet recording apparatus. In order to achieve a high printing quality, the recording element board has to be fixed on the supporting member with a high positioning accuracy and thus an adhesive that cures with heat or with ultraviolet rays is used to fix the recording element board.

The bonding/fixing procedure is performed in the following order. The supporting member and the recording element board are positioned relative to each other, the supporting member and the recording element board are brought into contact with each other with an adhesive interposed therebetween, and the recording element board is irradiated with heat or ultraviolet rays while being fixed by a holding member, which is a mounting tool, in order to secure the adhesive. If the curing of the adhesive is insufficient when the recording element board is released from positional restraint provided by the holding member after a predetermined period of time, the recording element board may be displaced due to reasons such as flowing of a liquid portion of the adhesive or cure shrinkage of the adhesive during curing in a furnace that follows the bonding. Considering the take time in the production process, accelerating the curing of the adhesive as much as possible during the bonding using the mounting tool is effective for highly accurately bonding and fixing the recording element board to the supporting member.

Generally, the curing state of an adhesive is controllable by changing the curing conditions in a mounting step. For example, increasing the amount of heat or ultraviolet radiation supplied to an area to be bonded can accelerate the curing of the adhesive.

PTL 1 discloses the following method. When the recording element board is to be bonded to the supporting member, in order to accelerate the curing of an adhesive, a voltage is applied to a wiring of the recording element board to cause the recording element board to generate heat in itself so that the recording element board is bonded to the supporting member by the heat.

PTL 2 discloses the following method. A heater is inserted into a hole formed in a supporting member to cause heat to be conducted to the supporting member. Thus, an adhesive that bonds the recording element board and the supporting member together is heated so that the curing of the adhesive is accelerated.

CITATION LIST

Patent Literature

PTL 1: Japanese Patent Laid-Open No. 10-100423
PTL 2: Japanese Patent Laid-Open No. 8-39848

The method by which the recording element board is caused to generate heat in itself is effective in terms of locally heating the vicinities of the portion to be bonded. However, as disclosed in PTL 1, in this method, the mounting tool has to be configured to apply a voltage to a recording element board H1101 to cause the recording element board H1101 to heat itself. For this purpose, the recording element board H1101 is mounted on the holding member after a connection terminal, through which a voltage is applied, is disposed on the holding member and then the terminal is connected to an electrode portion of the recording element board H1101. Consequently, the device becomes complex.

The method of PTL 2, on the other hand, is effective for improving the heat conductivity by increasing a heat conduction area. However, due to the need for forming a hole, the component rigidity or impact resistance of the supporting member deteriorates.

An object of the present disclosure is to provide a liquid ejection head that has a simple structure and that is formed by performing bonding and fixing operations speedily and highly accurately by accelerating heating of an adhesive when a recording element board is bonded to a supporting member, the liquid ejection head having a high liquid-landing accuracy and achieving a high printing quality. Another object of the present disclosure is to provide a method of manufacturing the liquid ejection head.

SUMMARY OF INVENTION

The present disclosure provides a method of manufacturing a liquid ejection head including a recording element board and a supporting member that supports the recording element board, the recording element board including an orifice through which a liquid is ejected and an energy generating element, which generates energy for ejecting the liquid. The method includes the steps of moving the recording element board supported by a holding member to a position above the supporting member to which a thermosetting adhesive has been applied; and conducting heat from the holding member to the supporting member and bringing the recording element board and the adhesive into contact with each other, while the recording element board is supported by the holding member, by bringing the recording element board and the supporting member closer to each other and bringing the holding member and the supporting member into contact with each other with a connection portion interposed therebetween.

Further features of the present disclosure will become apparent from the following description of exemplary embodiments with reference to the attached drawings.

DESCRIPTION OF EMBODIMENTS

Figure 1:
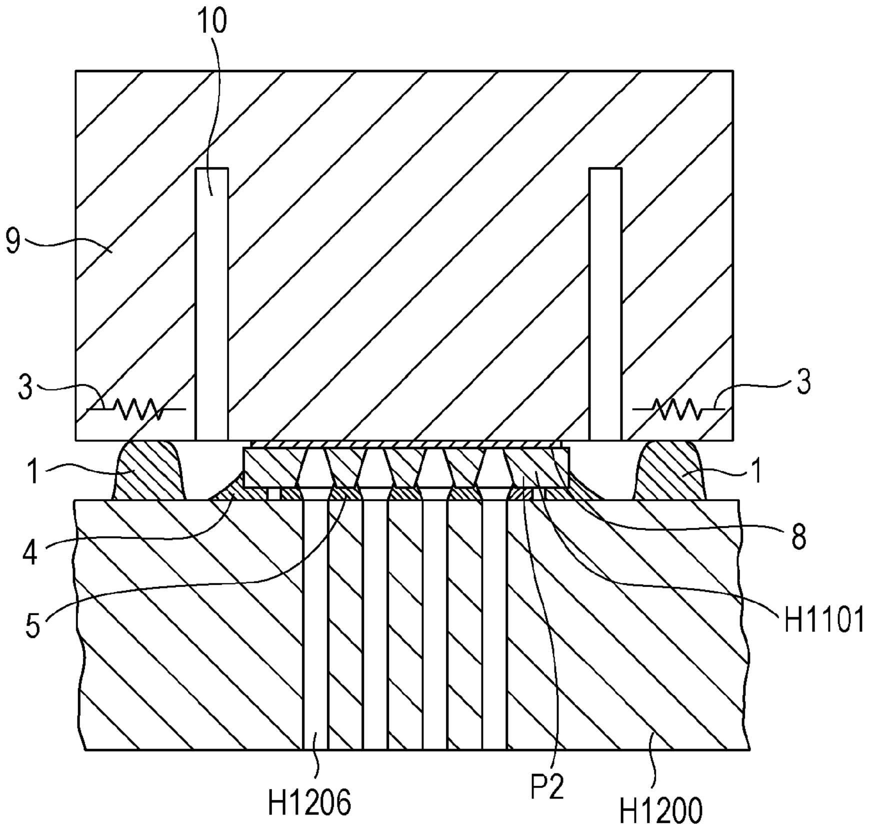
FIG. 1 is a schematic diagram of a configuration of a recording element unit and a manufacturing device according to a first embodiment.
Figure 2A:
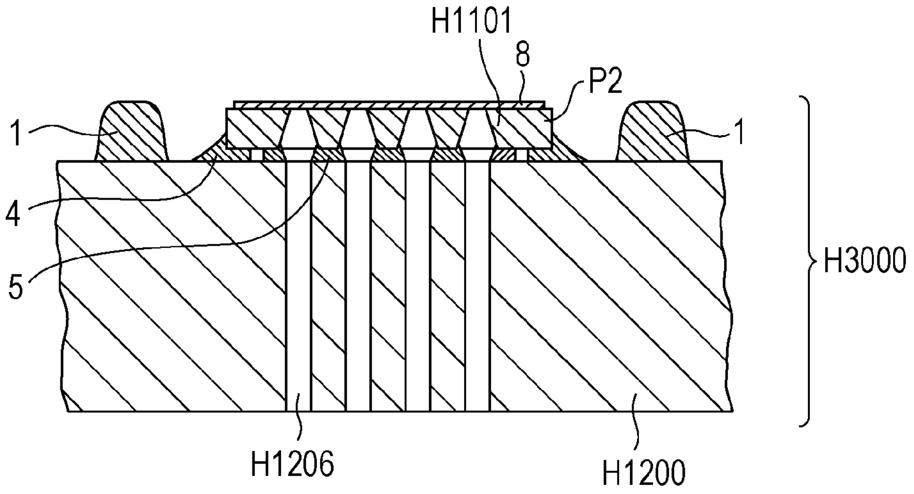
FIG. 2A is a schematic diagram of the configuration of the recording element unit according to the first embodiment.
Figure 2B:
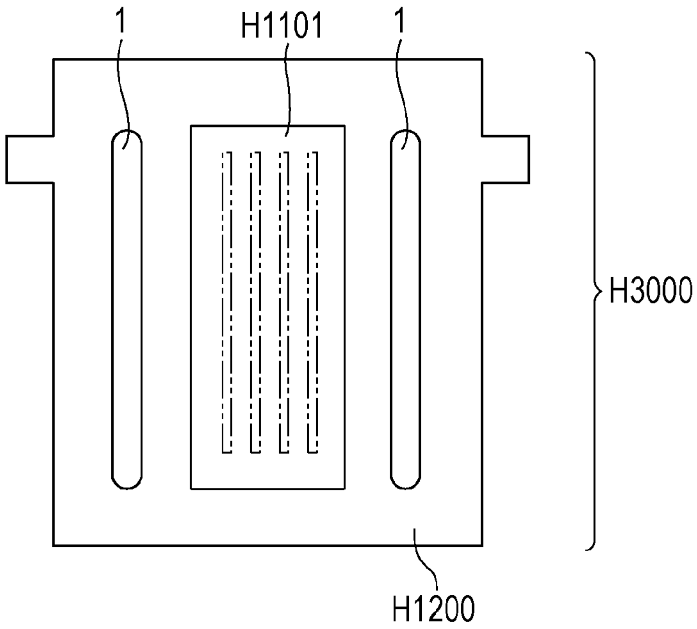
FIG. 2B is a schematic diagram of the configuration of the recording element unit according to the first embodiment.

Referring to the drawings, embodiments disclosed herein will be described below. As illustrated in FIGS. 1, 2A, and 2B, a recording element unit H3000 to which the present disclosure is applied includes a recording element board H1101 and a supporting member H1200. The recording element board H1101 includes a base plate P2, which includes an energy generating element (not illustrated) that generates energy for ejecting a liquid, and an orifice defining member 8, in which orifices through which a liquid is ejected are formed.

The recording element board H1101 and the supporting member H1200 are fixed to each other by using a first adhesive 4 and a second adhesive 5. The first adhesive 4 is a thermosetting epoxy-based adhesive that cures at a temperature lower than that at which the second adhesive 5 cures. An adhesive that cures at a temperature not exceeding 100° C. is preferable as the first adhesive 4. The second adhesive 5 has to have a function as part of ink feed paths, as well as a function of bonding and fixing the recording element board H1101 and the supporting member H1200 to each other. A highly ink-resistant epoxy-based adhesive is preferably selected as the second adhesive 5. As the second adhesive 5, an adhesive that cures with heat is preferable, and particularly, one that cures at a temperature not exceeding 150° C. is preferable.

Protrusions 1 disposed on the supporting member H1200 are members that, when the recording element board H1101 and the supporting member H1200 are to be bonded together, conducts heat of a holding member 9, which is a mounting tool and supports the recording element board, to the supporting member H1200. In this embodiment, the protrusions 1 and the supporting member H1200 are fixed to one another by using an adhesive.

By disposing the protrusions 1 near longitudinal sides of the recording element board H1101 as illustrated in the drawings, heat can be efficiently conducted to the first adhesive 4 and the second adhesive 5, and thus thermosetting of the adhesives can be accelerated. The protrusions 1 can be used as members for positioning the holding member 9 and the supporting member H1200 relative to each other when the recording element board H1101 is to be mounted on the supporting member. In order to efficiently conduct heat of the holding member 9, a contact surface of each protrusion 1 with which the holding member 9 comes into contact preferably has a surface flatness not exceeding 10 μm.

Here, a highly thermally conductive material, such as a highly thermally conductive adhesive, a thermally conductive Ag paste, a metal such as Al, or a ceramic such as alumina, is preferable as a material of the protrusions 1. The protrusions 1 and the supporting member H1200 may be made of the same material and may be integrally formed.

A material having a high coefficient of thermal conductivity and a low coefficient of linear expansion is preferable as a material of the holding member 9 that supports the recording element board H1101. Such a material can be selected from materials including Fe-based metals such as super Invar material, Al-based metals such as duralumin, and ceramics such as alumina or aluminum nitride. A composite material containing resin may be selected as a material of the supporting member H1200. In this case, the protrusions 1 and the supporting member H1200 can be made of the same material and easily molded in an integrated manner by using a die. In the case where resin is used as a material of the supporting member H1200, the material has to be rigid so as to suppress thermal deformation due to heating as much as possible. Thus, when a composite material containing resin is selected as a material for making the supporting member H1200 and the protrusions 1, a material having an elastic modulus in bending of 5000 MPa or greater is preferably selected. Here, the elastic modulus in bending can be controlled by adjusting the content of filler added to the composite material.

The protrusions 1 can also be used as contact surfaces for positioning the recording element board H1101 and the supporting member H1200 relative to each other. By using the contact surfaces as reference surfaces for mounting the liquid ejection head, ejection nozzles on the recording element board H1101 can be highly accurately positioned relative to a mount reference of the inkjet recording apparatus. With the high positioning accuracy relating to an ejection direction, a distance between the head and a sheet can be reduced.

First Embodiment

Hereinbelow, a first embodiment to which the present disclosure is applicable is described below. In this embodiment, a configuration will be described in which heat of the holding member can be efficiently conducted to an adhesive.

In this embodiment, the recording element board H1101 and the supporting member H1200 are bonded together by using two types of adhesives. A first adhesive 4 is applied to an outer periphery of the recording element board H1101 and a second adhesive 5 is applied to portions around the ink feed paths. As illustrated in FIGS. 2A and 2B, the protrusions 1 are formed along regions to which the first adhesive is applied, that is, at portions adjacent to longitudinal sides of the recording element board. By disposing the protrusions 1 as close as possible to the regions to which the first adhesive 4 and the second adhesive 5 are applied, heat conduction to the adhesives can be efficiently accelerated.

In this embodiment, a highly thermally conductive resin (DM6030-HK made by Diemat, Inc.) is used as a material of the protrusions 1. The coefficient of thermal conductivity of this material is about 60 W/m·K.

As illustrated in FIGS. 2A and 2B, the outer periphery of the recording element board H1101 is bonded to the supporting member H1200 by using the first adhesive 4, which cures at a relatively low temperature. Inner portions of the recording element board H1101 at which the ink feed paths are formed are bonded to the supporting member H1200 by using the highly ink-resistant second adhesive 5. Here, a thermosettable epoxy-based adhesive is selected as the second adhesive 5. An epoxy-based adhesive that cures at a temperature lower than that at which the second adhesive cures is used as the first adhesive 4 applied near the protrusions 1 to which heat is conducted from the holding member. These adhesives are selected from adhesives that can cure at a temperature ranging from 80 to 100° C. and within a time period ranging from 15 to 60 s.

Figure 3A:
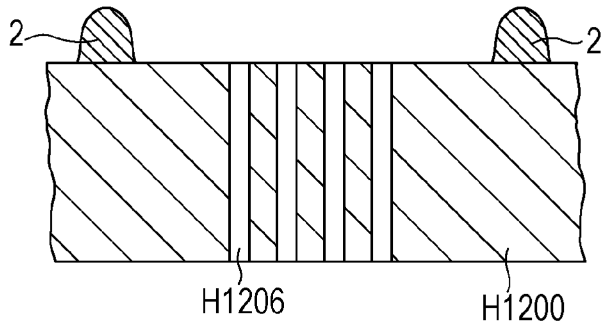
FIG. 3A is a schematic diagram illustrating a procedure of manufacturing the recording element unit according to the first embodiment.
Figure 3B:
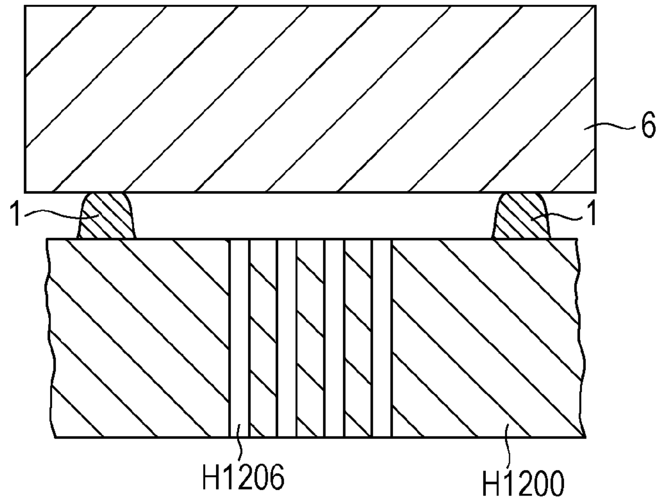
FIG. 3B is a schematic diagram illustrating the procedure of manufacturing the recording element unit according to the first embodiment.

Referring now to FIGS. 3A, 3B, 3C, 4A, 4B, and 4C, a manufacturing method according to the embodiment will be described below. Firstly, as illustrated in FIG. 3A, protrusions 1 are formed on the surface of the supporting member H1200 out of a highly thermally conductive resin. Subsequently, as illustrated in FIG. 3B, a protrusion flattening tool 6 applies pressure and heat to the protrusions to flatten top portions of the protrusions 1 such that the protrusions have a predetermined height, and thus the protrusions 1 are formed. At this time, the height of the protrusions 1 is controlled by using image processing performed from the side of the supporting member H1200.

Figure 3C:
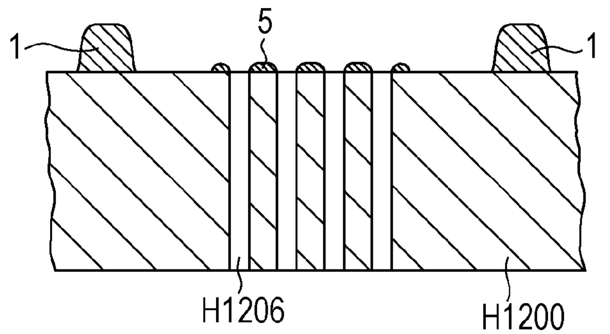
FIG. 3C is a schematic diagram illustrating the procedure of manufacturing the recording element unit according to the first embodiment.
Figure 4A:
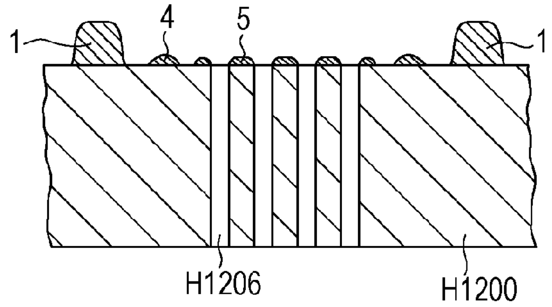
FIG. 4A is a schematic diagram illustrating the procedure of manufacturing the recording element unit according to the first embodiment.
Figure 4B:
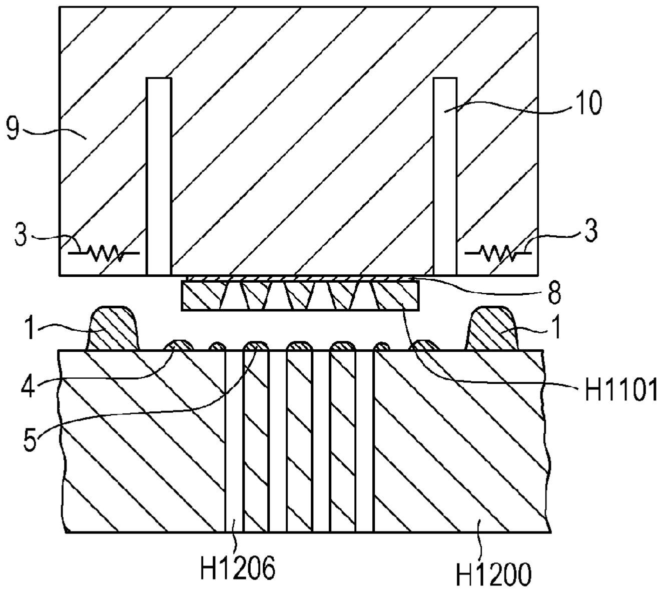
FIG. 4B is a schematic diagram illustrating the procedure of manufacturing the recording element unit according to the first embodiment.
Figure 4C:
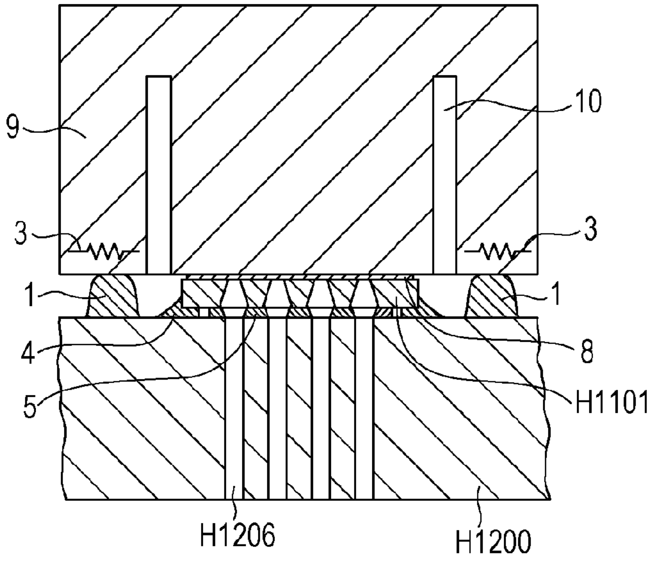
FIG. 4C is a schematic diagram illustrating the procedure of manufacturing the recording element unit according to the first embodiment.
Figure 5A:
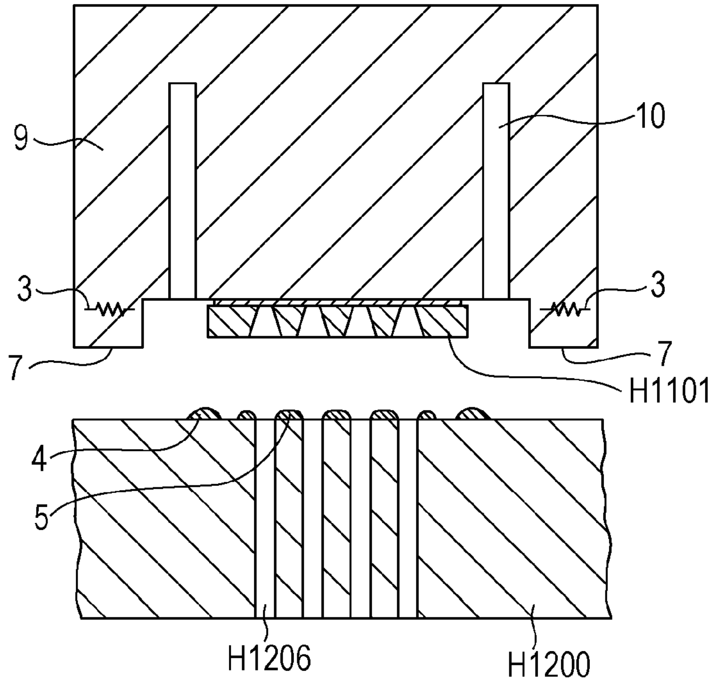
FIG. 5A is a schematic diagram illustrating a procedure of manufacturing a recording element unit according to a second embodiment.
Figure 5B:
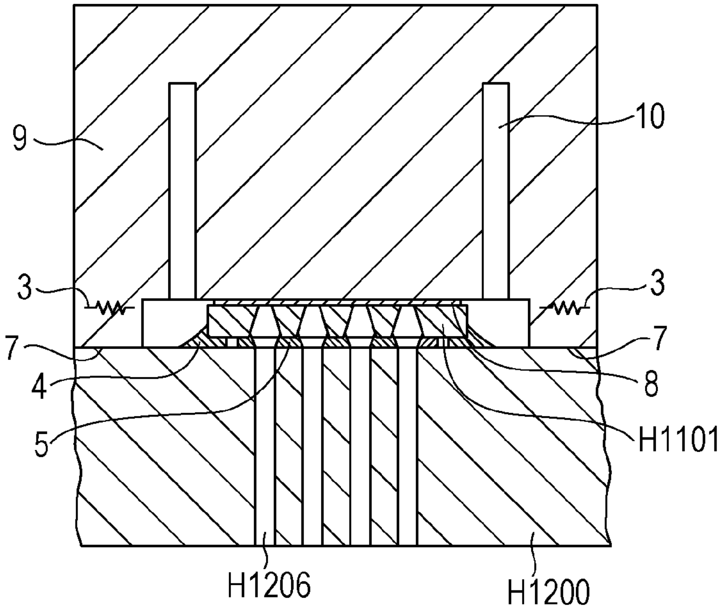
FIG. 5B is a schematic diagram illustrating the procedure of manufacturing the recording element unit according to the second embodiment.
Figure 6A:
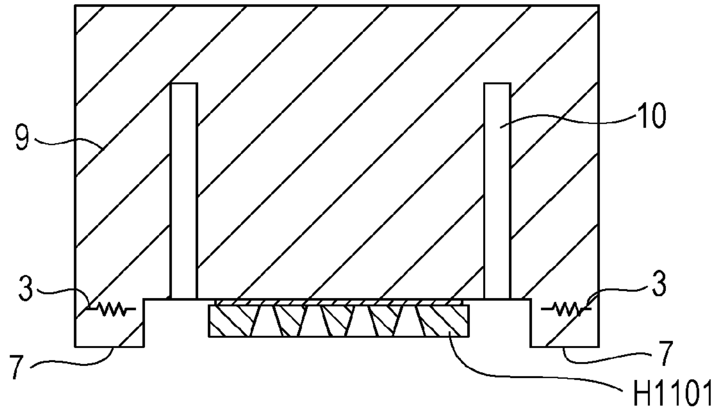
FIG. 6A is a schematic diagram of a holding member according to the second embodiment.
Figure 6B:
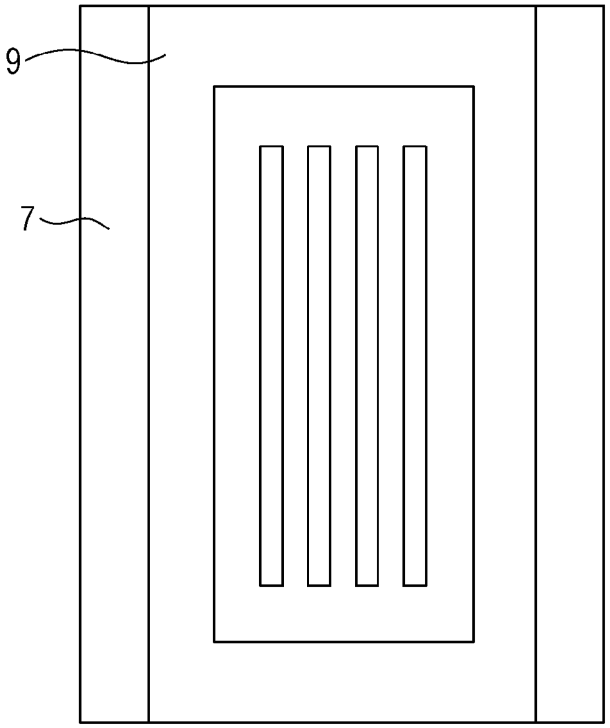
FIG. 6B is a schematic diagram of the holding member according to the second embodiment.

As illustrated in FIG. 3C, the second adhesive 5 is transferred or applied to the surface of the supporting member H1200 having the protrusions 1, which are connectors with which the holding member 9 comes into contact. As illustrated in FIG. 4A, the first adhesive 4 is transferred or applied to the surface. Then, as illustrated in FIG. 4B, the holding member 9 supports the recording element board H1101 and moves the recording element board H1101 to a position above the supporting member H1200. Then, while holding the recording element board H1101, the holding member 9 is moved downward to position the recording element board H1101 on the supporting member H1200. After the recording element board H1101 is positioned, the holding member is further moved downward so that the recording element board H1101 comes into contact with the first adhesive 4 and the second adhesive 5 and compresses the first adhesive 4 and the second adhesive 5. Here, the holding member includes heat generating elements 3 (heaters) serving as heat generating means, and is heated to a predetermined temperature. In order to efficiently conduct heat to the protrusions 1, it is preferable that the heaters 3 are disposed near a surface of the holding member that comes into contact with the protrusions. The orifice defining member 8 of the recording element board is made of resin. If heat is excessively applied to the recording element board, the orifice defining member 8 may be deformed or a portion of the orifice defining member 8 that is bonded to the base plate may be detached from the base plate. In view of these, it is preferable to form a recess 10 between a holding portion of the holding member, at which the recording element board H1101 is supported, and each heat generating element 3 of the holding member so that the heat of the heat generating elements 3 is no longer excessively conducted to the recording element board. In this embodiment, the heat generating element 3 heats the recording element board H1101 to approximately 200° C. As illustrated in FIG. 4C, when the holding member 9 comes into contact with contact portions of the protrusions 1, the heat of the holding member 9 is conducted to the supporting member H1200 through the contact portions. Concurrently, the recording element board stops descending and thus positioning of the recording element board in a direction perpendicular to the base plate of the recording element board is performed. In this manner, the heat conduction from the holding member to regions of the first adhesive 4 and the second adhesive 5 accelerates the curing of these adhesives. Here, it is preferable that the holding member 9 and the protrusions 1 come into contact with one another after the recording element board H1101 and the first and second adhesives come into contact with one another. If this order is reversed, that is, if the holding member 9 and the protrusions 1 come into contact with one another first, the adhesives start curing before the adhesives come into contact with the recording element board and may not be able to sufficiently exert its adhesion. Moreover, when the curing of the adhesives is started, a larger force may be needed to compress the adhesives and positioning of the recording element board may become difficult.

In this manner, the recording element board H1101 can be bonded and fixed to the supporting member H1200 speedily and highly accurately. In this embodiment, the protrusions 1 serve as contact reference surfaces used when the liquid ejection head is mounted on the inkjet recording apparatus. Thus, positioning of a recording sheet relative to the upper surface of the recording element board H1101 can be highly accurately performed.

After the recording element board H1101 and the supporting member H1200 are bonded together in this manner, the head thus bonded may be further put in an oven (for one hour at about 100° C., for example) to cause the first and second adhesives to cure completely.

In this embodiment, the first adhesive 4 and the second adhesive 5 are used. An adhesive of a type that cures at a low temperature lower is selected as the first adhesive considering the curing speed of the adhesive highly. A highly ink-resistant ink is selected as the second adhesive considering the ink resistance more highly than the curing speed of the adhesive since the second adhesive comes into contact with ink. The present invention is not limited to these, and the recording element board and the supporting member may be bonded and fixed together by using a single type of adhesive.

Second Embodiment

In this embodiment, description is given of a mode in which positioning of the recording element board H1101 can be performed further accurately.

Hereinbelow, a second embodiment to which this embodiment is applicable will be described. As illustrated in FIGS. 5A, 5B, 6A, and 6B, a holding member 9 according to this embodiment includes tool protrusions 7 that accelerate the conduction of heat to the supporting member H1200. When the recording element board H1101 is to be mounted on the supporting member H1200, the protrusions 7, which are connectors that come into contact with the supporting member, conduct heat of the holding member 9 to the supporting member H1200 by coming into contact with the surface of the supporting member H1200. As in the case of the first embodiment, by disposing the tool protrusions 7 as close as possible to regions to which the first adhesive 4 and the second adhesive 5 are applied, the conduction of heat to the adhesives can be efficiently accelerated. The tool protrusions 7 have a predetermined height. The first adhesive 4 and the second adhesive 5 are compressed until the tool protrusions 7 come into contact with the supporting member H1200. If the recording element board H1101 expands under the effect of the heat of the holding member and the thickness of the recording element board H1101 changes to some degree, the recording element board H1101 can be positioned at a predetermined height by controlling the degree of compression of the first adhesive 4 and the second adhesive. A super Invar material (MA-S-INVER made by Mitsubishi Materials Corporation), or a material similar to super Invar, is employed as the material of the holding member 9. The coefficient of linear expansion of the super Invar material is approximately 0.1 ppm and thus the super Invar material negligibly expands with heat. Therefore, the variance in the height of the tool protrusions 7 due to heating can be reduced as much as possible. Ceramics such as alumina, aluminum nitride, silicon carbide, silicon nitride, and zirconia may be used as a material of the holding member 9.

As illustrated in FIGS. 5A, 5B, 6A, and 6B, the outer periphery of the recording element board H1101 is bonded to the supporting member H1200 by using the first adhesive 4 that cures at a relatively low temperature. The inner portions of the recording element board at which the ink feed paths are formed are bonded to the supporting member H1200 by using the highly ink-resistant second adhesive 5.

Here, a thermosettable epoxy-based adhesive is selected as the second adhesive 5. An epoxy-based adhesive that cures at a low temperature is used as the first adhesive 4 applied to portions near the tool protrusions 7 (portions on the heat conduction sides). These adhesives are selected from adhesives that cure at a temperature ranging from 80 to 100° C. and within a time period ranging from 15 to 60 s.

Now, the manufacturing process will be described below. In the same process as in the first embodiment, the first adhesive 4 and the second adhesive 5 are transferred or applied to the surface of the supporting member H1200. Then, the holding member 9 that is holding the recording element board H1101 is moved downward to position the recording element board H1101 on the supporting member H1200. Here, the holding member is kept being moved downward until the tool protrusions 7 of the holding member 9 come into contact with the supporting member H1200. Heat generated by heat generators mounted on the holding member is conducted from the holding member 9 to the supporting member H1200 via the tool contact portions 7 of the holding member 9 by the tool protrusions 7 coming into contact with the supporting member H1200. The conduction of heat to regions of the first adhesive 4 and the second adhesive 5 accelerates the curing of these adhesives.

In this manner, the recording element board H1101 can be bonded and fixed to the supporting member H1200 speedily and highly accurately.

Figure 7:
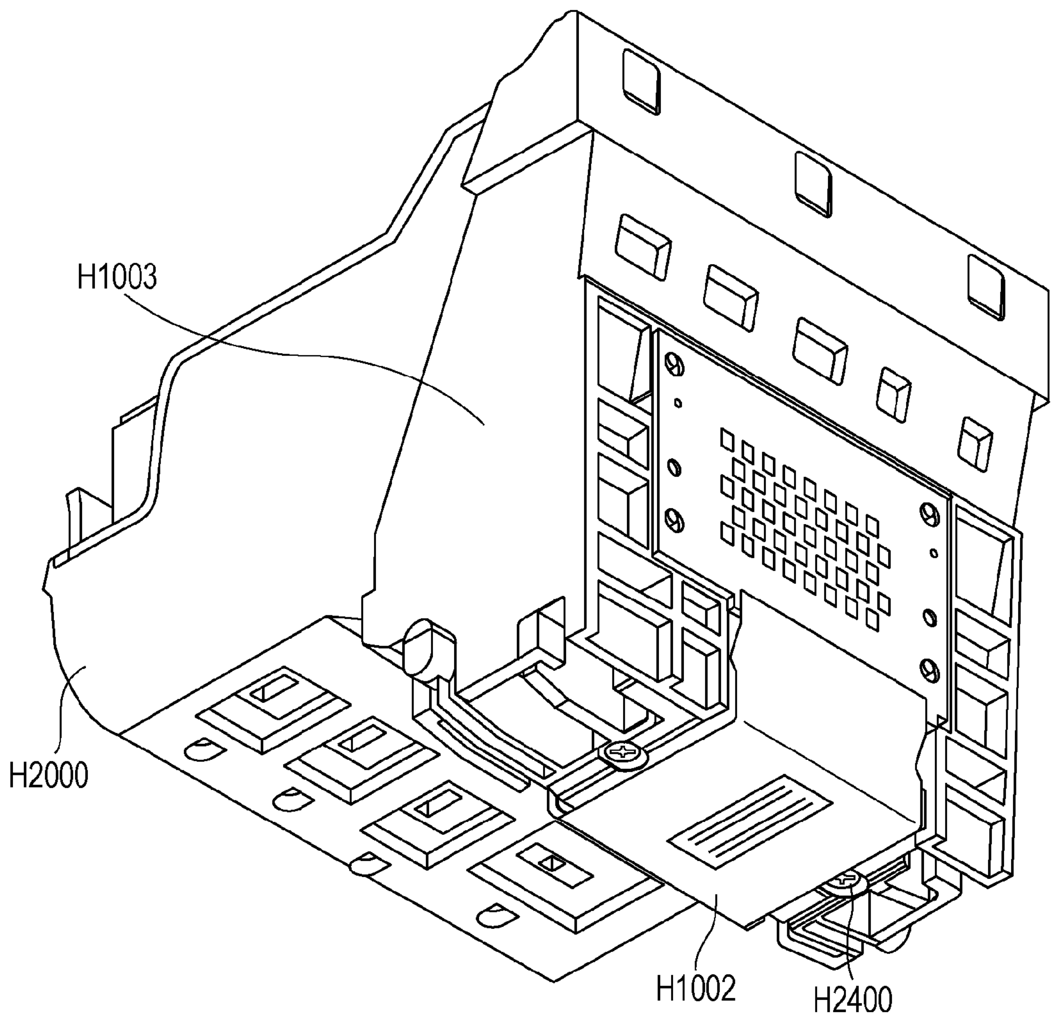
FIG. 7 is a schematic diagram of a configuration of a liquid ejection head.

In this manner, a recording element unit H1002 illustrated in FIG. 7 is formed, and the recording element unit and an ink feeding unit H1003 are joined together by using screws H2400. An ink tank, which is not illustrated, is mounted on a tank holder H2000.

The surface of the supporting member H1200 with which the tool protrusions 7 come into contact serves as a contact reference surface used when the liquid ejection head is mounted on the inkjet recording apparatus. Thus, positioning of a recording sheet relative to the upper surface of the recording element board H1101 can be performed highly accurately.

According to the present invention, the conductivity of heat from the holding member to the supporting member can be greatly improved when the recording element board and the supporting member are bonded together by using the holding member. This accelerates heating of the adhesive and bonding and fixing of the recording element board can be performed speedily and highly accurately. Thus, a liquid ejection head that has a high liquid-landing accuracy and that achieves a high printing quality can be obtained.

The present invention is not limited to the above embodiments, and may be changed or modified in various manners without departing from the sprit and scope of the present invention. Thus, in order to make the scope of the invention public, the following claims are included.

This application claims the benefit of International Patent Application No. PCT/JP2011/078744, filed Dec. 13, 2011, which is hereby incorporated by reference herein in its entirety.

The invention claimed is:

1. A method of manufacturing a liquid ejection head including a recording element board and a supporting member that supports the recording element board, the recording element board including an orifice through which a liquid is ejected and an energy generating element, which generates energy for ejecting the liquid, the method comprising the steps of:

moving the recording element board supported by a holding member to a position above the supporting member to which a thermosetting adhesive has been applied; and conducting heat from the holding member to the supporting member and bringing the recording element board and the adhesive into contact with each other, while the recording element board is supported by the holding member, by bringing the recording element board and the supporting member closer to each other and bringing the holding member and the supporting member into contact with each other with a connection portion interposed therebetween.

2. The method according to claim 1, wherein after the recording element board and the adhesive are brought into contact with each other, the holding member and the supporting member are brought into contact with each other with the connection portion interposed therebetween.

3. The method according to claim 1, wherein the holding member includes heat generating means and heat generated by the heat generating means is conducted to the adhesive through the connection portion and the supporting member.

4. The method according to claim 1, wherein the connection portion is a protrusion formed on the holding member.

5. The method according to claim 4, wherein the heat generating means is formed in the protrusion.

6. The method according to claim 1, wherein the connection portion is a protrusion formed on the supporting member and the protrusion has a higher thermal conductivity than the supporting member.

7. The method according to claim 4, wherein a recess is formed between a holding portion of the holding member, at which the recording element board is supported, and the protrusion formed on the holding member.

8. The method according to claim 6, wherein a recess is formed between a contact portion of the holding member, which comes into contact with the protrusion formed on the supporting member, and a holding portion of the holding member, at which the recording element board is supported.

9. The method according to claim 4, wherein positioning of the recording element board and the supporting member in a direction perpendicular to a surface of the supporting member that supports the recording element board is performed by bringing the protrusion formed on the holding member into contact with the supporting member.

10. The method according to claim 1, wherein the adhesive includes a first adhesive for bonding of an outer periphery of the recording element board and a second adhesive for bonding of an inner portion of the recording element board.

11. The method according to claim 10, wherein a curing temperature of the first adhesive is lower than a curing temperature of the second adhesive.

12. The method according to claim 1, wherein the connection portion is formed along a longitudinal side of the recording element board.

13. A liquid ejection head manufactured by the method according to claim 1, wherein the connection portion is formed at a portion of the supporting member that is adjacent a longitudinal side of the recording element board.

14. A liquid ejection head manufactured by the method according to claim 1, wherein the connection portion is a protrusion formed on the supporting member and the protrusion has a greater thermal conductivity than the supporting member.

* * * * *